United States Patent
Raghuvaran et al.

(10) Patent No.: US 11,362,991 B1
(45) Date of Patent: Jun. 14, 2022

(54) METHODS AND SYSTEMS FOR SHARING INTERNET PROTOCOL (IP) ADDRESS WITH MULTIPLE APPLIANCES FOR REDUNDANCY SUPPORT

(71) Applicant: Nile Global, Inc., Cupertino, CA (US)

(72) Inventors: Rupesh Raghuvaran, Bangalore (IN); Venu Hemige, San Ramon, CA (US); Gopal Raman, San Jose, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/368,789

(22) Filed: Jul. 6, 2021

(51) Int. Cl.
| | |
|---|---|
| *H04L 12/43* | (2006.01) |
| *H04L 12/28* | (2006.01) |
| *H04L 12/713* | (2013.01) |
| *H04L 12/70* | (2013.01) |
| *H04L 61/5046* | (2022.01) |

(52) U.S. Cl.
CPC .............................. *H04L 61/2046* (2013.01)

(58) Field of Classification Search
CPC .................................................. H04L 61/2046
See application file for complete search history.

(56) References Cited

U.S. PATENT DOCUMENTS

| | | | |
|---|---|---|---|
| 6,628,649 B1* | 9/2003 | Raj | H04L 45/586 370/360 |
| 9,491,084 B2 | 11/2016 | McGee et al. | |
| 10,404,622 B2 | 9/2019 | Tripathi et al. | |
| 2004/0008722 A1* | 1/2004 | G. Ellis | H04L 49/351 370/461 |
| 2010/0189117 A1* | 7/2010 | Gowda | H04L 12/66 370/401 |
| 2011/0274037 A1* | 11/2011 | Jain | H04W 8/085 370/328 |
| 2016/0087892 A1* | 3/2016 | Janakiraman | H04L 61/2015 370/392 |
| 2016/0344689 A1* | 11/2016 | Grevers, Jr | H04L 45/66 |
| 2018/0241622 A1* | 8/2018 | Chanda | H04L 41/0803 |
| 2021/0112009 A1 | 4/2021 | Takashige et al. | |

FOREIGN PATENT DOCUMENTS

WO    WO-2004028102 A1 *    4/2004    ......... H04L 12/2602

* cited by examiner

*Primary Examiner* — Christopher B Robinson
(74) *Attorney, Agent, or Firm* — Loza & Loza, LLP (57) ABSTRACT

Embodiments of a device and method are disclosed. In an embodiment, a method for network management involves at a switch connected to redundant network devices, receiving a notification indicating that a first network device of the redundant network devices is active, where the redundant network devices share a first internet protocol (IP) address, and at the switch, configuring routing information to include a route to the first IP address via a second IP address of the first network device.

20 Claims, 7 Drawing Sheets

At a distribution switch (DS) connected to redundant head ends (HEs), receive a notification indicating that a first HE of the redundant HEs is active, where the redundant HEs share a datapath internet protocol (IP) address — 702

At the DS, configure routing information to include a route to the datapath IP address via a control plane IP address of the first HE — 704

METHODS AND SYSTEMS FOR SHARING INTERNET PROTOCOL (IP) ADDRESS WITH MULTIPLE APPLIANCES FOR REDUNDANCY SUPPORT

BACKGROUND

Redundant network devices or appliances can be used to improve availability of a network. For example, network device or appliance redundancy plays an important role in ensuring that network designs and deployments meet agreed upon commitments. However, for a network with redundancy, it can be difficult to provide routing for a network device or appliance in the redundant network devices or appliances that assumes an active role due to topology constraints and/or traffic disruption time constraints. Therefore, there is a need for technology that can provide network routing management for a network with redundancy.

SUMMARY

Embodiments of a device and method are disclosed. In an embodiment, a method for network management involves at a switch connected to redundant network devices, receiving a notification indicating that a first network device of the redundant network devices is active, where the redundant network devices share a first internet protocol (IP) address, and at the switch, configuring routing information to include a route to the first IP address via a second IP address of the first network device. Other embodiments are also described.

In an embodiment, the rest of the redundant network devices are inactive.

In an embodiment, the redundant network devices include a first head end (HE) and a second HE.

In an embodiment, the first HE is active, and the second HE is inactive.

In an embodiment, the first IP address includes an internal IP address.

In an embodiment, the switch includes a distribution switch (DS).

In an embodiment, the switch is directly connected to the redundant network devices.

In an embodiment, the switch is directly connected to the redundant network devices through a plurality of Ethernet connections.

In an embodiment, the redundant network devices are connected to the switch without an intermediate device.

In an embodiment, the redundant network devices have different IP addresses.

In an embodiment, a switch connected to redundant network devices includes a transceiver configured to receive a notification indicating that a first network device of the redundant network devices is active, where the redundant network devices share a first IP address, and a controller to configure routing information to include a route to the first IP address via a second IP address of the first network device.

In an embodiment, the rest of the redundant network devices are inactive.

In an embodiment, the redundant network devices include a first HE and a second HE.

In an embodiment, the first HE is active, and the second HE is inactive.

In an embodiment, the first IP address includes an internal IP address.

In an embodiment, the switch includes a DS.

In an embodiment, the redundant network devices are directly connected to the DS.

In an embodiment, the switch is directly connected to the redundant network devices without an intermediate device.

In an embodiment, the switch is connected to the redundant network devices through a plurality of Ethernet connections.

In an embodiment, a method for network management involves at a DS connected to redundant HEs, receiving a notification indicating that a first HE of the redundant HEs is active, where the redundant HEs share a datapath IP address, and at the DS, configuring routing information to include a route to the datapath IP address via a control plane IP address of the first HE.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
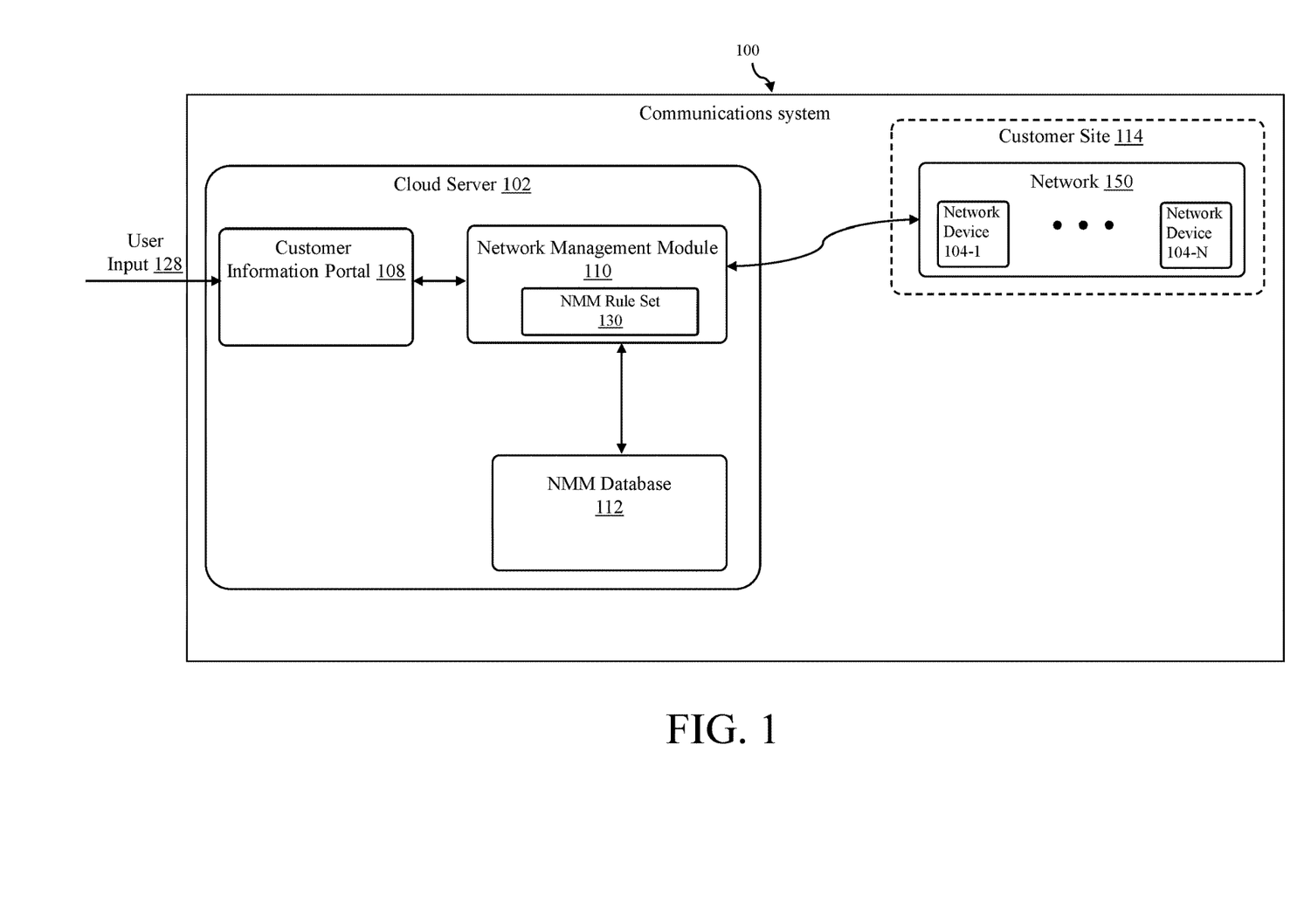
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a network routing service) to network devices (e.g., the deployed network 150) at the customer site. Because the cloud server can facilitate or perform a network management service for network devices at the customer site, network management efficiency can be improved. In addition, because the cloud server can facilitate or perform a network management service for network devices at the customer site, a user or customer of the customer site can be notified of a network outage. Consequently, network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS). In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service to network devices (e.g., the deployed network 150) at the customer site 114, for example, using an NMM rule set 130. The NMM rule set 130 may include one or more NMM rules for network devices at the customer site 114, for example, for performing an NMM service to network devices at the customer site 114. In some embodiments, the NMM module 110 is configured to generate and/or transmit at least one alert regarding a network deployed and/or to be deployed at the customer site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). For example, the NMM database 112 is configured to store NMM measurement data and/or a list of specific levels of network availability, coverage and/or capacity for network devices deployed at the customer site 114. In some embodiments, the NMM database 112 is configured to store the at least one NMM alert. Because the NMM module can facilitate or perform an NMM service for network devices at the customer site, network management efficiency can be improved. In addition, because the NMM deployment module can facilitate or perform an NMM service for network devices at the customer site, an administrator or a customer can be notified of network conditions or outrages. Consequently, network outage time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
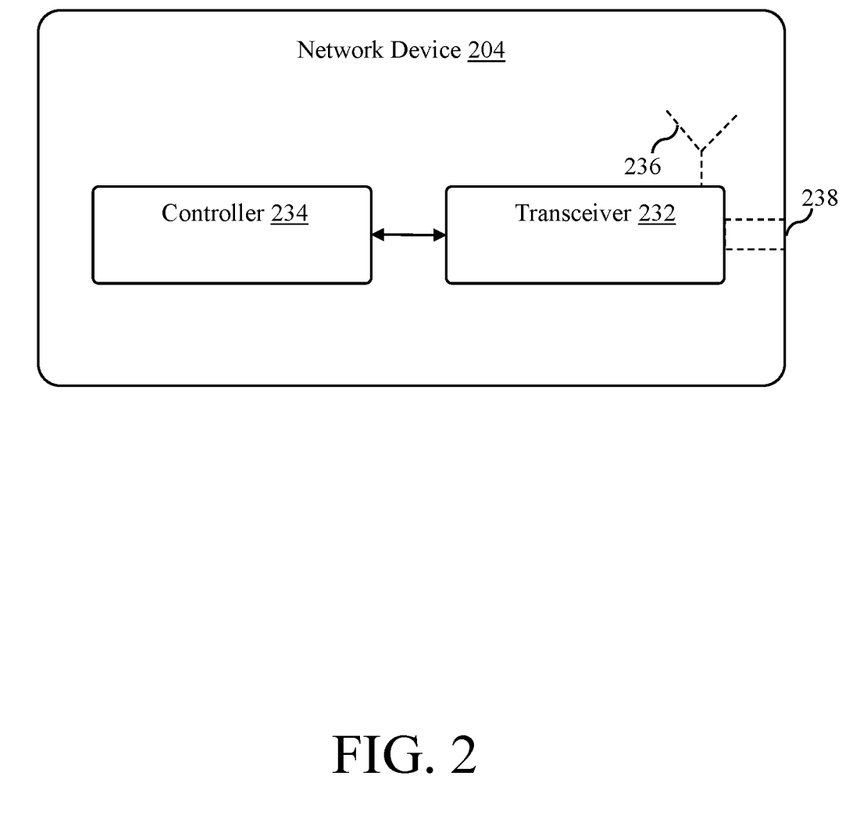
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor, described in more detail with reference to FIG. 3. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any suitable type of transceiver. For example, the transceiver 232 may be a short-range communications transceiver (e.g., a Bluetooth transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth transceiver) and a WLAN transceiver (e.g., a transceiver compatible with an IEEE 802.11 protocol). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
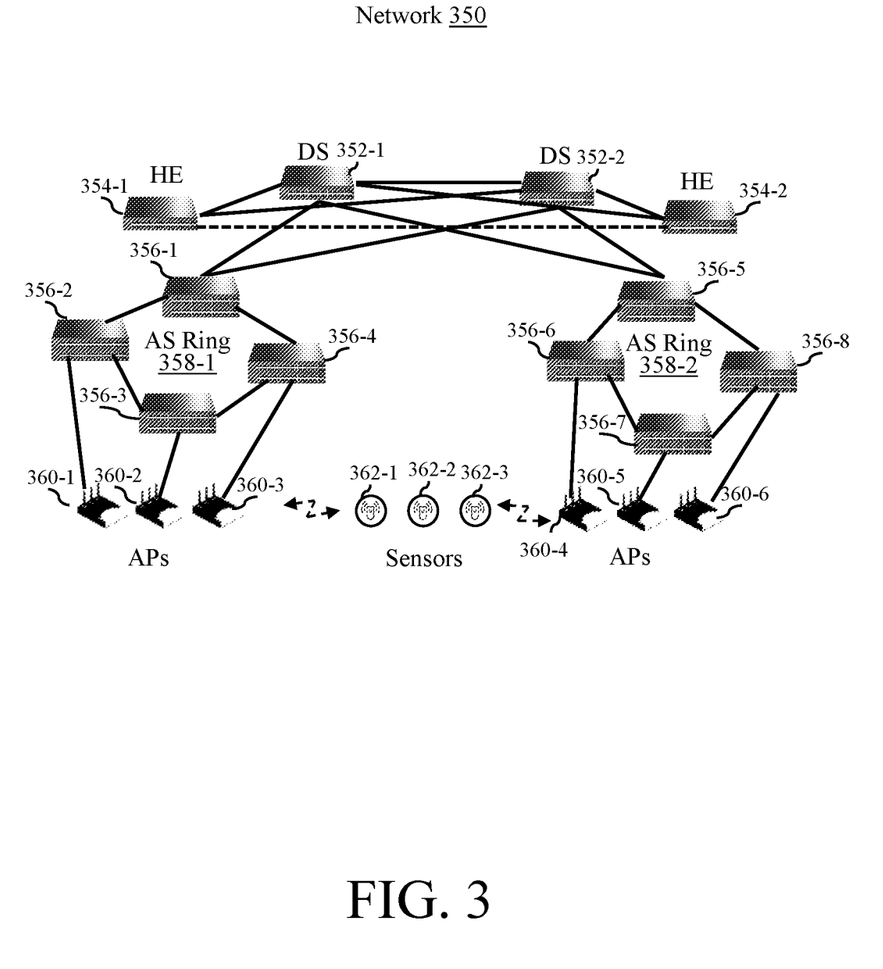
FIG. 3 depicts an embodiment of a network that can be deployed at a customer site.

FIG. 3 depicts an embodiment of a network 350 that can be deployed at the customer site 114. The network 350 depicted in FIG. 3 is one possible embodiment of the deployed network 150 at the customer site 114 depicted in FIG. 1. However, the deployed network 150 at the customer site 114 depicted in FIG. 1 is not limited to the embodiment shown in FIG. 3. In some embodiments, the network 350 is a basic building block for providing connectivity as a service and is a replicable block that can be scaled (e.g., expanded)

to meet any deployment need. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of optional access switches (ASs) 356-1, 356-2, 356-3, 356-4, 356-5, 356-6, 356-7, 356-8 connected in rings 358-1, 358-2 that can interact with lower level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs and are configured to measure and monitor network information at the customer site 114. In some embodiments, the network 350 does not include access switches and the wireless APs are directly connected (e.g., without any intermediate device) to the DS 352-1 and/or the DS 352-2. In some embodiments, at least one of the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and the wireless sensors 362-1, 362-2, 362-3 depicted in FIG. 3 is implemented as the network device 204 depicted in FIG. 2.

In some embodiments, the Ass 356-1, 356-2, 356-3, 356-4, 356-5, 356-6, 356-7 and the wireless APs 360-1, 360-2, 360-3, 360-4, 360-5, 360-6 tunnel traffic from wired/wireless clients (e.g., the wireless sensors 362-1, 362-2, 362-3) to the HEs 354-1, 354-2 where client subnet level-2 (L2) traffic is terminated. A head end appliance (e.g., the HE 354-1 or 354-2) in addition to being the gateway for client and forwarding traffic to/from the rest of the network 350, also provides deep packet inspection and policy application for the client traffic. Head end availability can be critical to the wired/wireless access service availability delivered by the ASs and/or the wireless APs. The availability for the service can be ensured by providing redundant appliances in which one of the redundant appliances assumes an active role providing the service. In some solutions, redundant devices are configured with the same IP address and connected to the same L2 switch that connects to a router. However, the redundancy requires a direct physical link where a liveness check and role negotiation between the redundancy pair is done. In such topology, the active device assumes the ownership for the IP address and responds to an Address Resolution Protocol (ARP) resolution message from the uplink router. The topology requirement/choice of avoiding L2 forwarding on a distribution switch (DS) and to have all the traffic to be only L3 forwarded to network elements makes the above approach difficult to implement. In another possible solution, redundant HE devices use different IP addresses and the ASs and/or the wireless APs set up tunnels to both HE devices and only forward client traffic via the active HE tunnel, and switch the client traffic to the other tunnel in the event of a failure of the active HE. However, the role switch to a new active HE needs to be communicated to numerous access points and access switches downstream such that client traffic is switched to tunnel to the new active HE, which can be difficult to achieve in time to minimize traffic disruptions.

Figure 4:
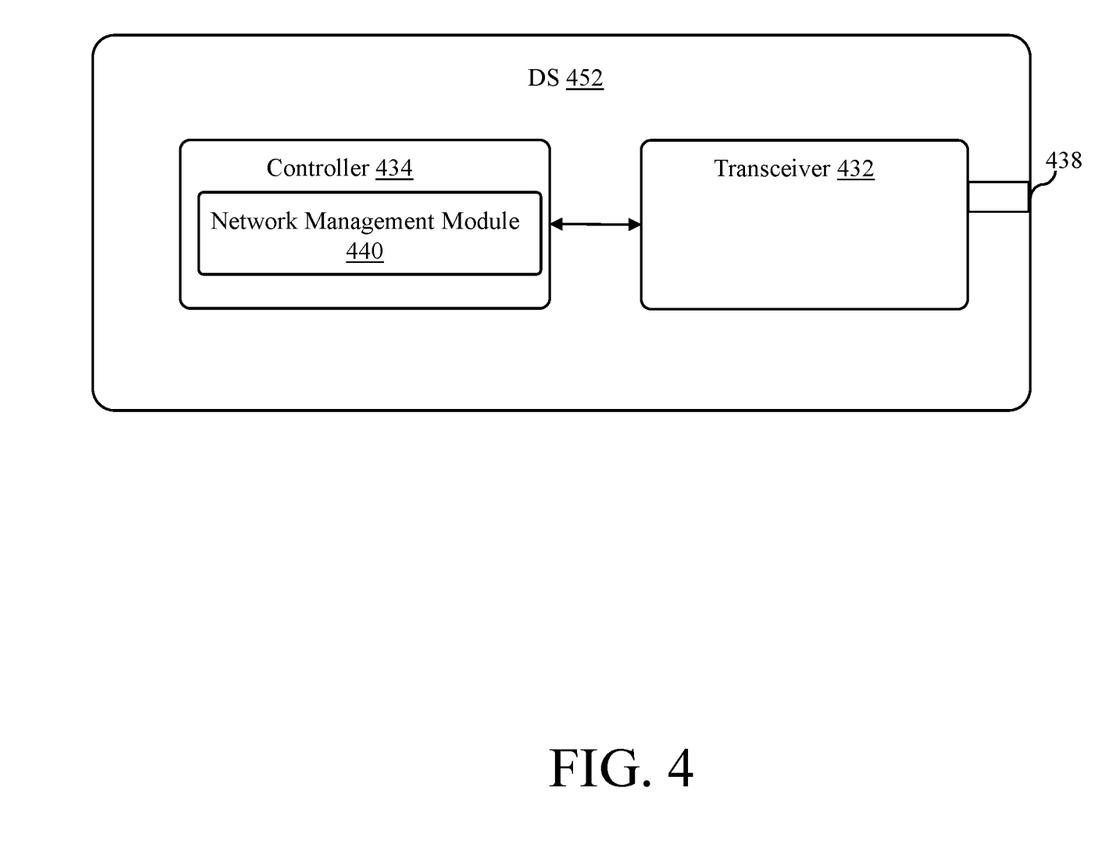
FIG. 4 depicts an embodiment of a distribution switch (DS) that can be installed in a customer site.

FIG. 4 depicts an embodiment of a distribution switch (DS) 452 that can be installed in the customer site 114. The DS 452 depicted in FIG. 4 is one possible embodiment of DS (e.g., the DS 352-1 or 352-2) that can be installed at the customer site 114 depicted in FIG. 1. However, DSs that can be installed at the customer site 114 depicted in FIG. 1 are not limited to the embodiment shown in FIG. 4. In the embodiment depicted in FIG. 4, the DS 452 includes a transceiver 432, a controller 434 operably connected to the transceiver 432, and at least one network port 438 operably connected to the transceiver 432. The transceiver 432 may be any suitable type of transceiver. For example, the transceiver 432 may be a wired transceiver (e.g., a transceiver compatible with an IEEE 802.3 protocol such as an Ethernet transceiver). In some embodiments, the DS 452 includes multiple transceivers, for example, a wired transceiver and a WLAN transceiver (e.g., a transceiver compatible with an IEEE 802.11 protocol). In some embodiments, the controller 434 is configured to control the transceiver 432 to process packets received through the network port 438 and/or to generate outgoing packets to be transmitted through the network port 438. In some embodiments, the controller 434 is configured to perform a network management function, e.g., to generate routing information relevant to the DS 452. For example, the controller 434 may be configured to generate a routing table relevant to the DS 452. In some embodiments, the controller 434 includes a network management module 440 configured to perform a network management function. For example, the network management module 440 is configured to generate routing information relevant to the DS 452. In some embodiments, the network management module 440 is configured to generate a routing table relevant to the DS 452. The network port 438 may be any suitable type of network port. For example, the network port 438 may be a physical port such as an Ethernet port or a virtual port. However, the network port is not limited to an Ethernet port or a virtual port. In some embodiments, the DS 452 includes multiple network ports, for example, multiple virtual ports and/or multiple physical ports.

In some embodiments, the DS 452 is connected to redundant network devices, the transceiver 432 is configured to receive a notification indicating that a first network device of the redundant network devices is active, where the redundant network devices share a first internet protocol (IP) address, and the controller 434 (e.g., the network management module 440 of the controller) is configured to configure routing information to include a route to the first IP address via a second IP address of the first network device. By configuring the same IP address for redundant network devices with a configuration update of routing information only on the DS 452, the use of flooding of the failover event to multiple network elements can be avoided and traffic disruption can be reduced or minimized. In some embodiments, the rest of the redundant network devices are inactive. In some embodiments, the redundant network devices include a first head end (HE) and a second HE. In some embodiments, the first HE is active and the second HE is inactive. In some embodiments, the first IP address includes an internal IP address. In some embodiments, the redundant network devices are directly connected to the DS 452. In some embodiments, the DS 452 is directly connected to the redundant network devices through Ethernet connections.

In some embodiments, a packet is forwarded on the distribution switch 452 based on an IP address. For redundant HEs directly connected to the distribution switch 452, only the HE that is assuming the active role receives all the client traffic from a corresponding AS and/or a corresponding wireless AP over the tunnel by steering the traffic to the active HE instances using the dynamic L3 route update. Each of the redundant HEs is configured with the same datapath tunnel service IP address in addition to a unique IP address. The distribution switch interface is configured with an explicit IP address and an explicit recursive route to the datapath tunnel service IP address via the unique IP address.

The active HE has two IP addresses configured on the loopback interface, one IP address (e.g., CP-IP) is for control plane IP services and the other IP address (e.g., DP-IP) is for datapath tunnel termination and other services. In some embodiments, a physical interface (e.g., a physical ethernet interface) is not configured with an explicit IP address. Instead, the physical interface is configured as IP unnumbered, specifying that the physical interface uses the IP address configured on the loopback interface. Consequently, whenever a packet is received on either of the physical ethernet interfaces, the corresponding physical interface can process the packet with the IP address configured on the loopback interface, which enables a device (e.g., the distribution switch 452) to use the same IP address for packet reception on both physical interfaces. The route to the peer distribution switch IP address is explicitly configured via the CP-IP specific route on the interface device. The default route may be configured to be via the IP addresses of distribution switches the HE is connected to, e.g., IPds1 and IPds2. The control plane IP may be used for the liveness detection between the peer HE and peer DS and for other control plane interactions between an HE and an AP/AS. The datapath service IP address may be configured on each of the redundant HEs but orchestrated to receive traffic for the IP address only on the active HE. The DS may receive control plane messages from the active HE to route to the datapath virtual IP address via the control plane IP address of that active HE.

Figure 5:
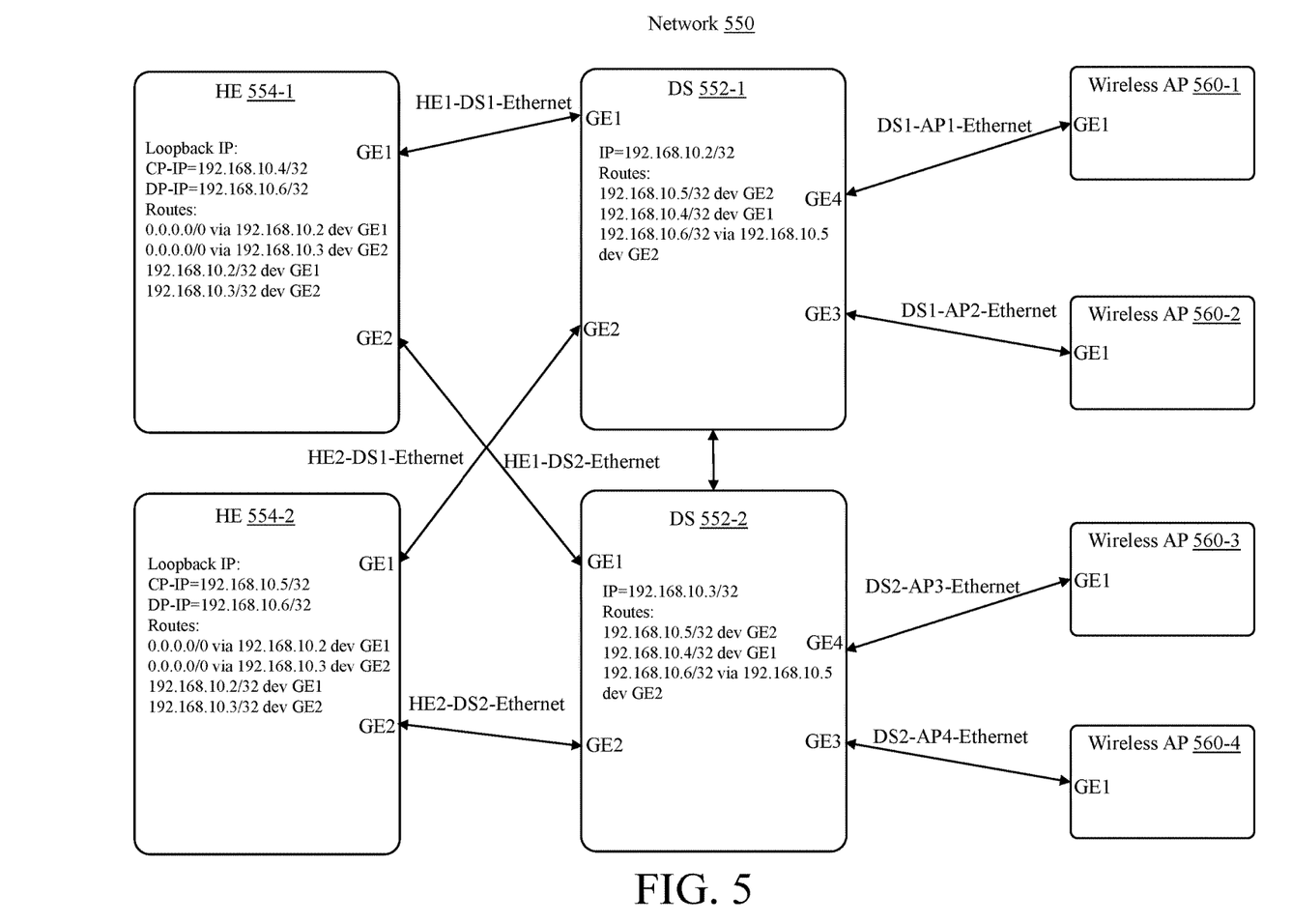
FIG. 5 depicts IP address information and routing tables of a network having redundant head ends (HEs), multiple DSs, and multiple wireless access points (APs).

FIG. 5 depicts IP address information and routing tables of a network 550 having redundant HEs 554-1, 554-2, two DSs 552-1, 552-2, and wireless APs 560-1, 560-2, 560-3, 560-4. The HEs 554-1, 554-2, the DSs 552-1, 552-2, and the wireless APs 560-1, 560-2, 560-3, 560-4 depicted in FIG. 5 may be similar to or the same as the HEs 354-1, 354-2, the DSs 352-1, 352-2, and the wireless APs 360-1, 360-2, 360-3, 360-4, 360-5, 360-6 depicted in FIG. 3, respectively. As depicted in FIG. 5, the redundant HEs 554-1, 554-2 are connected to the DSs 552-1, 552-2 through Ethernet connections, HE1-DS1-Ethernet, HE2-DS1-Ethernet, HE1-DS2-Ethernet, HE2-DS2-Ethernet, and respective Gigabit Ethernet (GE) ports, GE1, GE2, which are in turn connected to the wireless APs 560-1, 560-2, 560-3, 560-4 through Ethernet connections, DS1-AP1-Ethernet, DS1-AP2-Ethernet, DS2-AP3-Ethernet, DS2-AP4-Ethernet, and respective GE ports, GE1, GE3, GE4. In some embodiments, the redundant HEs 554-1, 554-2 are directly connected to the DSs 552-1, 552-2, for example, without any intermediate devices. In some embodiments, the HEs 554-1, 554-2, the DSs 552-1, 552-2, and the wireless APs 560-1, 560-2, 560-3, 560-4 have other types of network ports. In some embodiments, a packet that is sent from the wireless AP 560-1, 560-2, 560-3, or 560-4 traverses through the DSs 552-1, 552-2 and the HEs 554-1, 554-2.

In the embodiment depicted in FIG. 5, the HE 554-1 has a control plane IP address (CP-IP) of 192.168.10.4/32 and a datapath virtual or internal IP address (DP-IP) of 192.168.10.6/32, and the HE 554-2 has a control plane IP address (CP-IP) of 192.168.10.5/32 and the same datapath virtual IP address (DP-IP) of 192.168.10.6/32 as the HE 554-1. In some embodiments, an internal IP address is also referred to as a local IP address or a private IP address, which is an IP address that is assigned by a local network device (e.g., a local network router) and is only seen by other computers in a local network and not by computers connected to an external network, such as the Internet. The datapath virtual IP address of 192.168.10.6/32 is configured on both of the HEs 554-1, 554-2 and only one of the HEs 554-1, 554-2 uses the datapath virtual IP address of 192.168.10.6/32 at a given time. Routing information of the HEs 554-1, 554-2 indicates the connections between the HEs 554-1, 554-2 and the DSs 552-1, 552-2.

In the embodiment depicted in FIG. 5, based on the role decided by an HE redundancy transaction protocol between the HE 554-1 and the HE 554-2, one of the HEs 554-1, 554-2 is active while the other one of the HEs 554-1, 554-2 remains inactive. For example, when the HE 554-2 is active and the HE 554-1 is inactive (e.g., on standby), the HE 554-2 notifies the DSs 552-1, 552-2 about its active role, and both of the DSs 552-1, 552-2 configure the forwarding route to the datapath virtual IP address of 192.168.10.6/32 via the control plane IP address of 192.168.10.5/32, for example, within an interface the DSs 552-1, 552-2 have towards the HE 554-2. In the embodiment depicted in FIG. 5, the DS 552-1 has an IP address of 192.168.10.2/32 and the DS 552-2 has an IP address of 192.168.10.3/32. Based on the role decided by the HE redundancy pair, the DSs 552-1, 552-2 appropriately update the route information to the datapath virtual IP address of 192.168.10.6 to ensure the proper forwarding of the traffic. For example, routing information stored in the DS 552-1 indicates the connections between the HEs 554-1, 554-2 and the DS 552-1 and the access to the DP-IP of 192.168.10.6/32 via the CP-IP of 192.168.10.5/32 of the active HE 554-2, while routing information stored in the DS 552-2 indicates the connections between the HEs 554-1, 554-2 and the DS 552-2 and the access to the DP-IP of 192.168.10.6/32 via the CP-IP of 192.168.10.5/32 of the active HE 554-2. In some embodiments, client traffic from the wireless APs 560-1, 560-2, 560-3, 560-4 is encapsulated in a tunnel (e.g., a Generic Routing Encapsulation (GRE) tunnel) and tunnel termination is based on the datapath virtual IP address of 192.168.10.6/32. By configuring the same IP address for redundant HEs 554-1, 554-2 with explicit configuration update of routing information only on the directly connected the DSs 552-1, 552-2, the use of flooding of the failover event to multiple network elements can be avoided and traffic disruption can be reduced or minimized.

Figure 6:
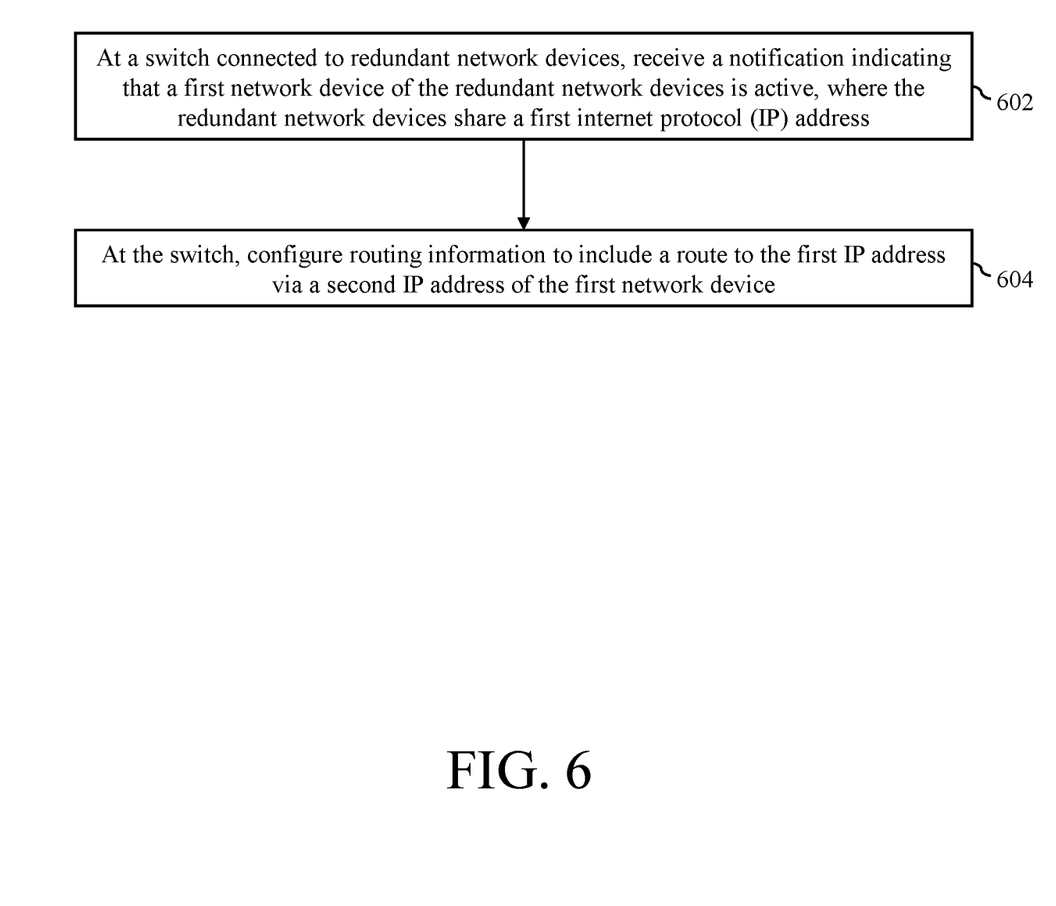
FIG. 6 is a process flow diagram of a method for network management accordance to another embodiment of the invention.

FIG. 6 is a process flow diagram of a method for network management accordance to another embodiment of the invention. According to the method, at block 602, at a switch connected to redundant network devices, a notification indicating that a first network device of the redundant network devices is active is received, where the redundant network devices share a first internet protocol (IP) address. At block 604, at the switch, routing information is configured to include a route to the first IP address via a second IP address of the first network device. The redundant network devices may be similar to, the same as, or a component of the HEs 354-1, 354-2 depicted in FIG. 3 and/or the HEs 554-1, 554-2 depicted in FIG. 5. The switch may be similar to, the same as, or a component of the DSs 352-1, 352-2 depicted in FIG. 3, the DS 452 depicted in FIG. 4 and/or the DSs 552-1, 552-2 depicted in FIG. 5.

Figure 7:
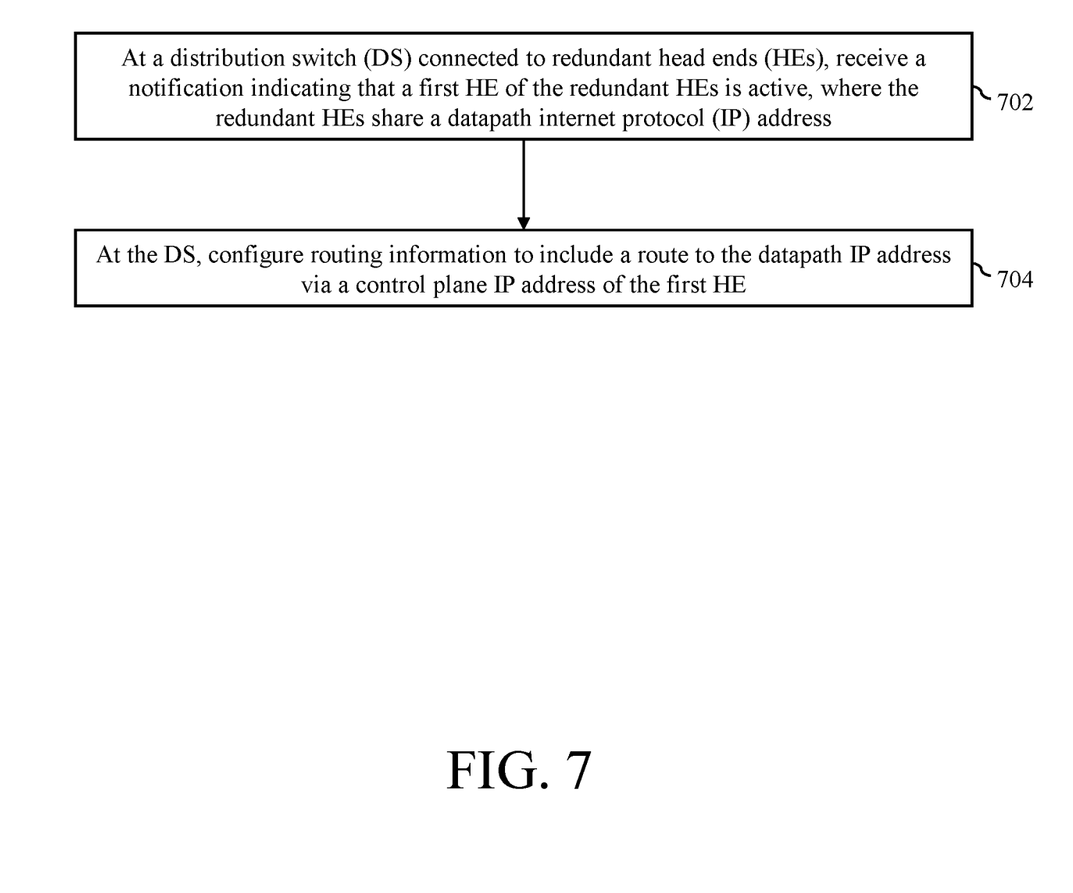
FIG. 7 is a process flow diagram of a method for network management accordance to another embodiment of the invention.

FIG. 7 is a process flow diagram of a method for network management accordance to another embodiment of the invention. According to the method, at block 702, at a distribution switch (DS) connected to redundant head ends (HEs), a notification indicating that a first HE of the redundant HEs is active is received, where the redundant HEs share a datapath internet protocol (IP) address. At block 704, at the DS, routing information is configured to include a route to the datapath IP address via a control plane IP address of the first HE. The redundant network devices may be similar to, the same as, or a component of the HEs 354-1, 354-2 depicted in FIG. 3 and/or the HEs 554-1, 554-2 depicted in FIG. 5. The switch may be similar to, the same as, or a component of the DSs 352-1, 352-2 depicted in FIG. 3, the DS 452 depicted in FIG. 4 and/or the DSs 552-1, 552-2 depicted in FIG. 5.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network management, the method comprising:
   at a first switch connected to a plurality of redundant network devices through a plurality of network ports of the first switch, receiving a first notification indicating that a first network device of the redundant network devices, which is connected to a first network port of the network ports of the first switch, is active, wherein the redundant network devices share a first internet protocol (IP) address;
   at a second switch connected to the redundant network devices through a plurality of network ports of the second switch, receiving a second notification indicating that the first network device of the redundant network devices, which is connected to a second network port of the network ports of the second switch, is active;
   at the first switch, configuring routing information to include a first route to the first IP address via a second IP address of the first network device through the first network port of the network ports of the first switch; and
   at the second switch, configuring routing information to include a second route to the first IP address via the second IP address of the first network device through the second network port of the network ports of the second switch.

2. The method of claim 1, wherein the rest of the redundant network devices are inactive.

3. The method of claim 1, wherein the redundant network devices include a first head end (HE) and a second HE.

4. The method of claim 3, wherein the first HE is active, and wherein the second HE is inactive.

5. The method of claim 1, wherein the first IP address comprises an internal IP address.

6. The method of claim 1, wherein the first switch or the second switch comprises a distribution switch (DS).

7. The method of claim 1, wherein the first switch or the second switch is directly connected to the redundant network devices.

8. The method of claim 7, wherein the first switch or the second switch is directly connected to the redundant network devices through a plurality of Ethernet connections.

9. The method of claim 1, wherein the redundant network devices are connected to the first switch or the second switch without an intermediate device.

10. The method of claim 1, wherein the redundant network devices have different IP addresses.

11. A switch system connected to a plurality of redundant network devices, the switch system comprising:
    a first switch connected to the redundant network devices through a plurality of network ports of the first switch, the first switch comprises:
      a first transceiver configured to receive a first notification indicating that a first network device of the redundant network devices, which is connected to a first network port of the network ports of the first switch, is active, wherein the redundant network devices share a first internet protocol (IP) address; and
      a second controller to configure routing information to include a first route to the first IP address via a second IP address of the first network device through the first network port of the network ports of the first switch; and
    a second switch connected to the redundant network devices through a plurality of network ports of the second switch, the second switch comprises:
      a second transceiver configured to receive a second notification indicating that the first network device of the redundant network devices, which is connected to a second network port of the network ports of the second switch, is active; and
      a second controller to configure routing information to include a second route to the first IP address via a second IP address of the first network device through the second network port of the network ports of the second switch.

12. The switch system of claim 11, wherein the rest of the redundant network devices are inactive.

13. The switch system of claim 11, wherein the redundant network devices include a first head end (HE) and a second HE.

14. The switch system of claim 13, wherein the first HE is active, and wherein the second HE is inactive.

15. The switch system of claim 11, wherein the first IP address comprises an internal IP address.

16. The switch system of claim 11, wherein the first switch or the second switch comprises a distribution switch (DS).

17. The switch system of claim 16, wherein the redundant network devices are directly connected to the DS.

18. The switch system of claim 11, wherein the first switch or the second switch is directly connected to the redundant network devices without an intermediate device.

19. A method for network management, the method comprising:
- at a first distribution switch (DS) connected to a plurality of redundant head ends (HEs) through a plurality of network ports of the first DS, receiving a first notification indicating that a first HE of the redundant HEs, which is connected to a first network port of the network ports of the first DS, is active, wherein the redundant HEs share a datapath internet protocol (IP) address;
- at a second DS connected to the redundant network devices through a plurality of network ports of the second DS, receiving a second notification indicating that the first HE of the redundant network devices, which is connected to a second network port of the network ports of the second DS, is active;
- at the first DS, configuring routing information to include a first route to the datapath IP address via a control plane IP address of the first HE through the first network port of the network ports of the first DS; and
- at the second DS, configuring routing information to include a second route to the first IP address via the second IP address of the first HE through the second network port of the network ports of the second DS.

20. The method of claim 1, wherein client traffic for the redundant network devices is encapsulated in a tunnel and tunnel termination is based on the first IP address shared by the redundant network devices.

* * * * *